G. COLUCCI.
OMNIBUS AEROPLANE.
APPLICATION FILED MAY 14, 1912.

1,068,108.

Patented July 22, 1913.
6 SHEETS—SHEET 1.

Witnesses:
G. L. Johnson
P. N. Pizzetti

Inventor:
Giuseppe Colucci,
Attorneys.

G. COLUCCI.
OMNIBUS AEROPLANE.
APPLICATION FILED MAY 14, 1912.

1,068,108.

Patented July 22, 1913.
6 SHEETS—SHEET 4.

Witnesses:
G. L. Johnson
O. N. Pezzetti

Inventor:
Giuseppe Colucci,
by Mason, Fenwick & Lawrence
Attorneys.

G. COLUCCI.
OMNIBUS AEROPLANE.
APPLICATION FILED MAY 14, 1912.

1,068,108.

Patented July 22, 1913.
6 SHEETS—SHEET 6.

Witnesses:
G. L. Johnson
P. W. Pezzetti

Inventor:
Giuseppe Colucci,
by Wright Brown Quimby May
Attorneys.

UNITED STATES PATENT OFFICE.

GIUSEPPE COLUCCI, OF BOSTON, MASSACHUSETTS.

OMNIBUS-AEROPLANE.

1,068,108. Specification of Letters Patent. Patented July 22, 1913.

Application filed May 14, 1912. Serial No. 697,146.

*To all whom it may concern:*

Be it known that I, GIUSEPPE COLUCCI, a subject of the King of Italy, (who has declared his intention of becoming a citizen of the United States,) and resident of Boston, in the county of Suffolk and State of Massachusetts, have invented certain new and useful Improvements in Omnibus-Aeroplanes, of which the following is a specification.

This invention relates to flying machines of the aeroplane type and has for its objects, first, to provide a means for utilizing more completely than hitherto the supporting power of air currents, both direct and indirect, by means of the form of the wings or planes, their disposition and their profile, whereby to obtain a greater supporting power proportionally to the weight of the machine and to enable a machine of greater size and carrying capacity to be produced; second, to diminish the resistance to forward flight of the machine, while at the same time increasing its strength, by the peculiar mode of construction hereinafter described and by the almost complete elimination of cords or stay wires, whereby a speed of from eighty-five to one hundred and ten miles an hour may be attained without risk either to the machine or the passengers; and to provide a landing carriage of novel and improved design permitting the machine to alight upon and arise from either land or water.

The means and features of construction by which I attain the foregoing objects are set forth in detail in the following specification and illustrated in the drawings accompanying the same in which—

Fig. 11 is a cross section of the same. Fig. 12 is a plan view of the flexible rear guide plane. Fig. 12$^a$ is a sectional view of the horizontal staying plane. Fig. 13 is an elevation of a part of the landing carriage.

The same reference characters indicate the same parts in all the figures.

Figure 1:
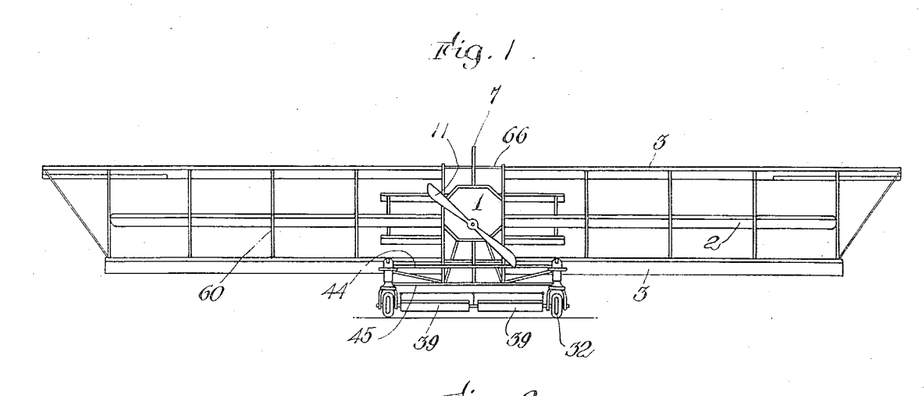
Figure 1 is a front elevation of the entire machine.
Figure 2:
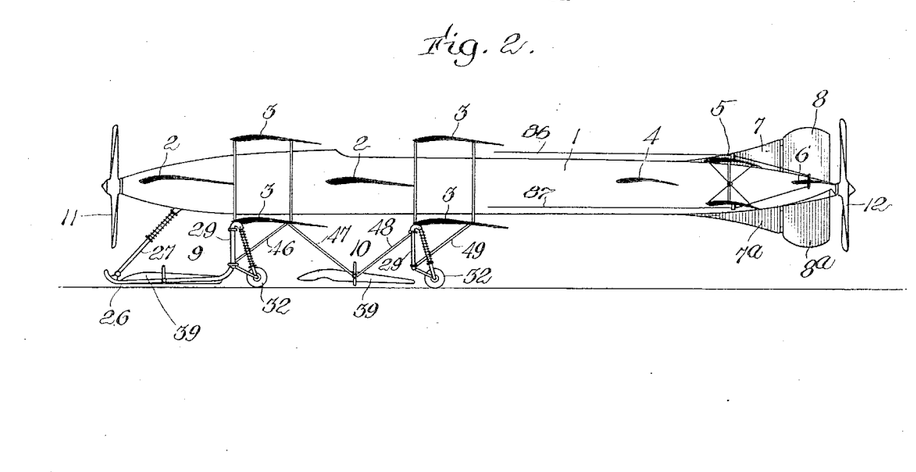
Fig. 2 is a side elevation of the same.
Figure 3:
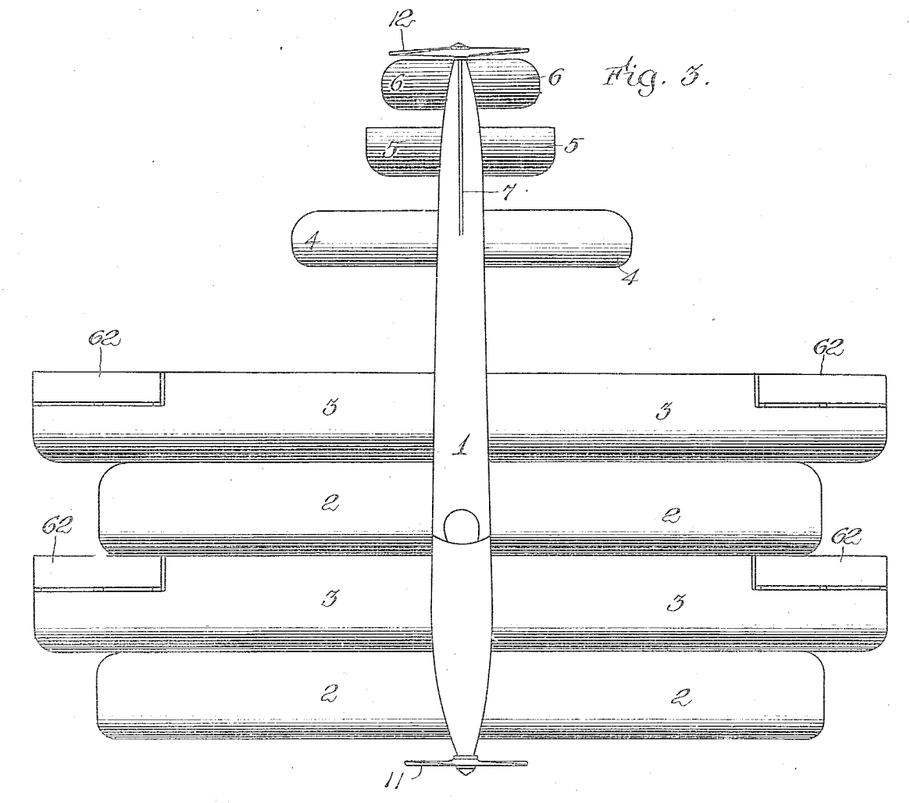
Fig. 3 is a plan view. The scale of the foregoing figures is 1 to 100.

The essential parts of the machine as appear from Figs. 1, 2, and 3 are a body 1, supporting monoplanes 2—2 and biplanes 3—3, alternating in their arrangement, a flexible but otherwise immovable horizontal steadying plane 4, a compound or biplane pivotally mounted horizontal rudder 5, a single or monoplane pivotally mounted horizontal rudder 6, a fixed vertical steadying keel, made in two parts 7 and 7$^a$, a vertical rudder in two parts 8 and 8$^a$ hinged at the rear end of the keel, supporting carriages 9 and 10, and propellers 11 and 12 at the ends of the body.

Figures 6, 7, 8:
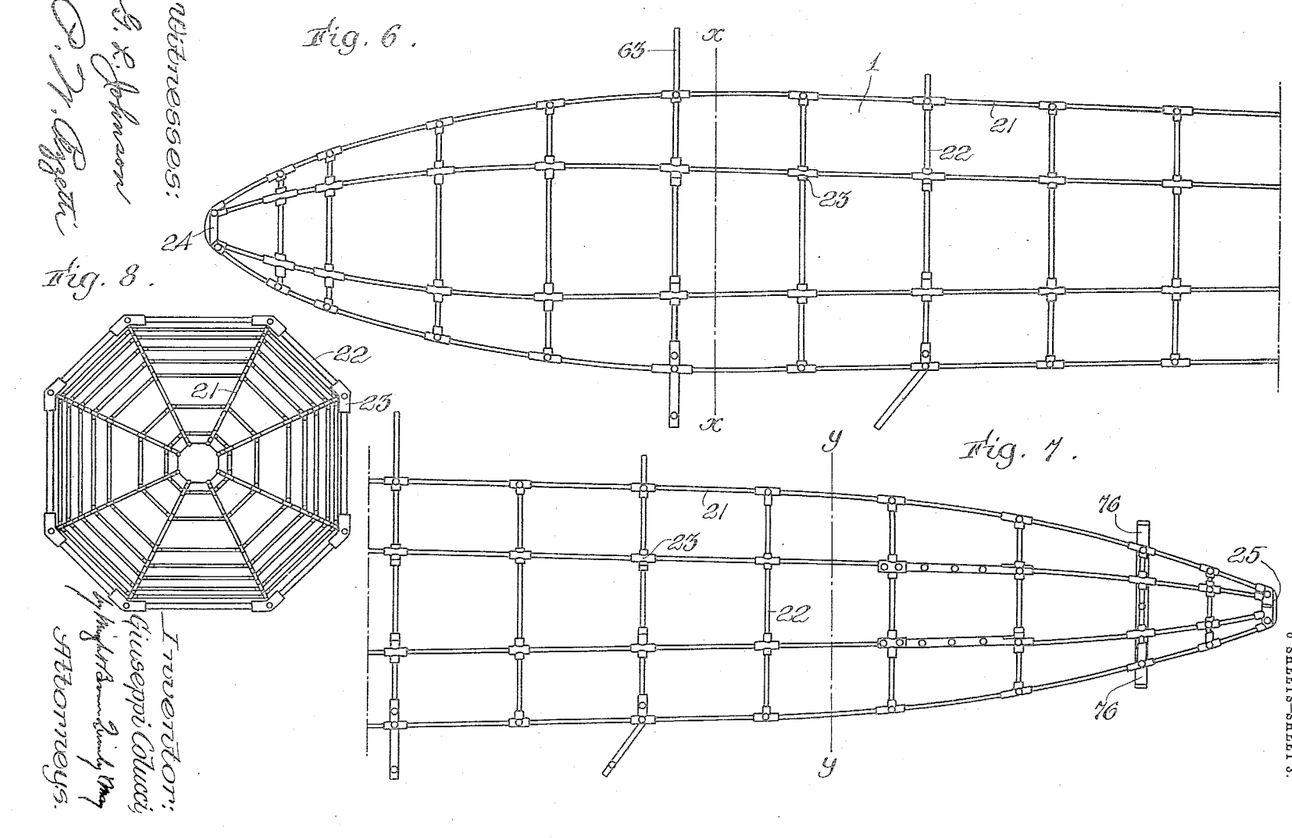
Figs. 6 and 7 represent, respectively, the forward and rear portions of the body or hub of the machine with the cloth covering removed.
Fig. 8 is an end view of the same.

For the details of construction of the body, reference is made to Figs. 6, 7, and 8. The body is generally cigar shaped or spindle shaped with its larger end directly forwardly. Its skeleton or frame is constructed preferably of tempered steel tubes, there being preferably 8 longitudinal members 21 disposed at the angles of an octagon, and any desired number of transverse braces 22 joined to the longitudinals by couplings 23. The longitudinal members may consist of separate sections joined together end to end by these couplings. The whole constitutes a sufficiently strong and yet at the same time light structure which is sufficiently elastic in its several members to eliminate in a large measure danger of deformation from shocks in alighting. By making the skeleton of short lengths of tubing autogenously joined together, the entire structure is made homogeneous with practically as great strength and elasticity as though the members were continuous. On the other hand the breakage of any one of the pieces is a relatively very slight injury which can be easily repaired by substitution of a new piece. Interior braces in the nature of cross braces, diagonals and struts may be secured within the body structure and connected to the external frame members in the manner described, wherever necessary or desirable, as at those portions where the wings are attached or where the driving motors or other concentrated weights are mounted. The greatest diameter of the body is at the line $x$—$x$ near the forward end, and from there tapers rapidly with the extreme forward end. From the line $x$—$x$ the body tapers gradually and uniformly to the line $y$—$y$ near the rear end, from which there is a more abrupt taper to the extreme end. At the forward and rear end, respectively, are plates 24, 25 which provide the bearings for the propellers.

In the construction of the frame all stay wires and cords are carefully eliminated, whereby the setting up of the frame is much facilitated and when once set up properly it remains so for all time. A covering of canvas or other cloth is fastened about and upon the frame. Owing to the form above described, the body is able to displace the air with the least possible resistance, so that a high speed may be quickly attained and maintained with the least possible expenditure of power.

For supporting the machine upon the ground or on water, I provide carriages which are shown in connection with the machine in Figs. 1 and 2, and one of which is shown in detail in side elevation in Fig. 13. These comprise skids 26 connected at their forward ends by a shock absorber 27, 28 with one of the lower longitudinals 21 of the body frame and at their rear ends to posts 29, the junctions being made by means of pivots which give flexibility. To the upper and lower ends of each post, respectively, are connected forks 30 and 31 in both of which is held the axle of a trundle wheel 32, the connection of fork 30 with the upper end of the post being made by a bowed piece 29ª, to which piece there is also attached a clamp member 29ᵇ fastened to the frame structure of one of the lower planes 3 of the biplane construction. The fork 31 is attached to a telescopic rod 33 pivoted at 24 to the head of the post and surrounded by a spring 35 which tends to hold the telescopic rod expanded and to diminish the shock in striking the ground. The shock absorber first mentioned consists of a piston rod 27 and a cylinder 28 in which said rod is movable endwise, such piston containing a body of air, which forms a perfect spring, and oil for lubrication and to prevent escape of the air. A valve 36 is provided for replenishment of the supply within the cylinder. The skids support brackets 37 having bearings for a rod 38 passing through and connected to floats 39 for sustaining the weight of the machine upon water. These floats are maintained in equilibrium in the position shown by means of springs 40, 41 which are connected with an arm 42 rising from the shaft 38 and with the skids on opposite sides, respectively, of such arm. The foregoing description relates to the carriage designated 9 in Fig. 2, this being the forward carriage. All the parts of this carriage are in duplicate, there being two skids, two floats, and two wheels. The wheels 32 in connection with those of the rear carriage normally support the machine when resting upon the ground, the skids being provided to absorb the shock in alighting and to protect the floats. Their forward ends which strike the ground are protected by metallic reinforcing pieces 43.

The rear carriage 10 is similar to that described with the exception that the skids and the forward dash pot or shock absorber are omitted. It includes two floats 39 and trundle wheels 32, mounted as before described except that the posts 29 of the trundle wheels are pivotally connected with the attaching frame to permit lateral swinging of the wheels. The parts of the carriages are connected together by cross pieces 44, 45 (Fig. 1) and longitudinal diagonals 46, 47, 48, and 49, all of these being preferably of steel tubing and being provided with sockets which receive and are secured to projecting studs or pins, also preferably sections of tubing 67, 67ª of the wing frames (shown in Figs. 6 and 7).

Figure 9:
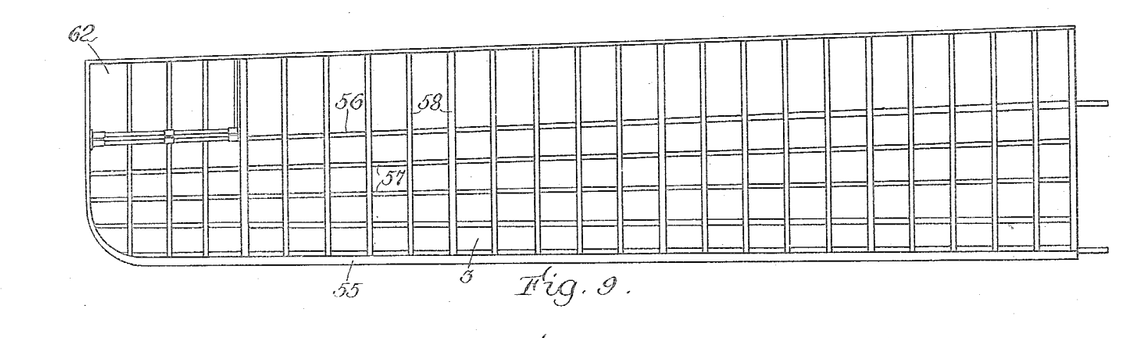
Fig. 9 is a plan view and Fig. 10 a front elevation of one of the main biplanes of the machine.
Figure 10:
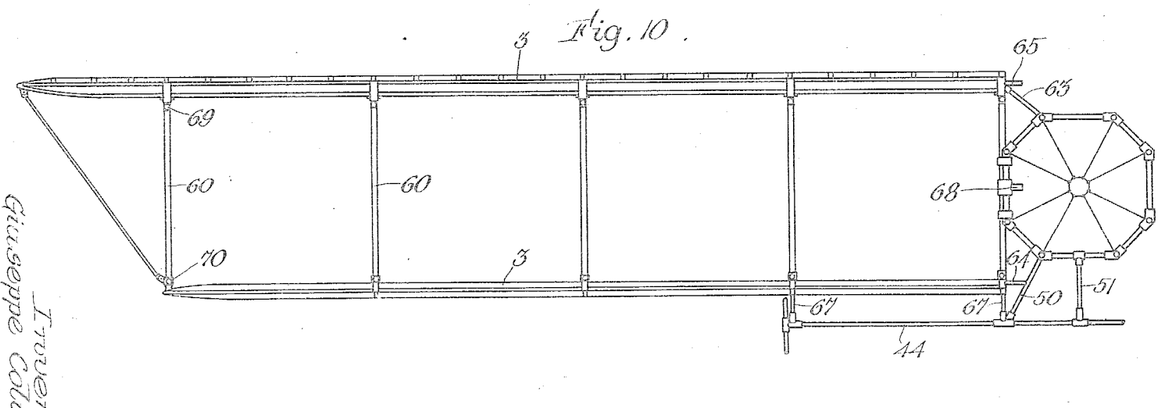
Figures 11, 12, 12A, 15:
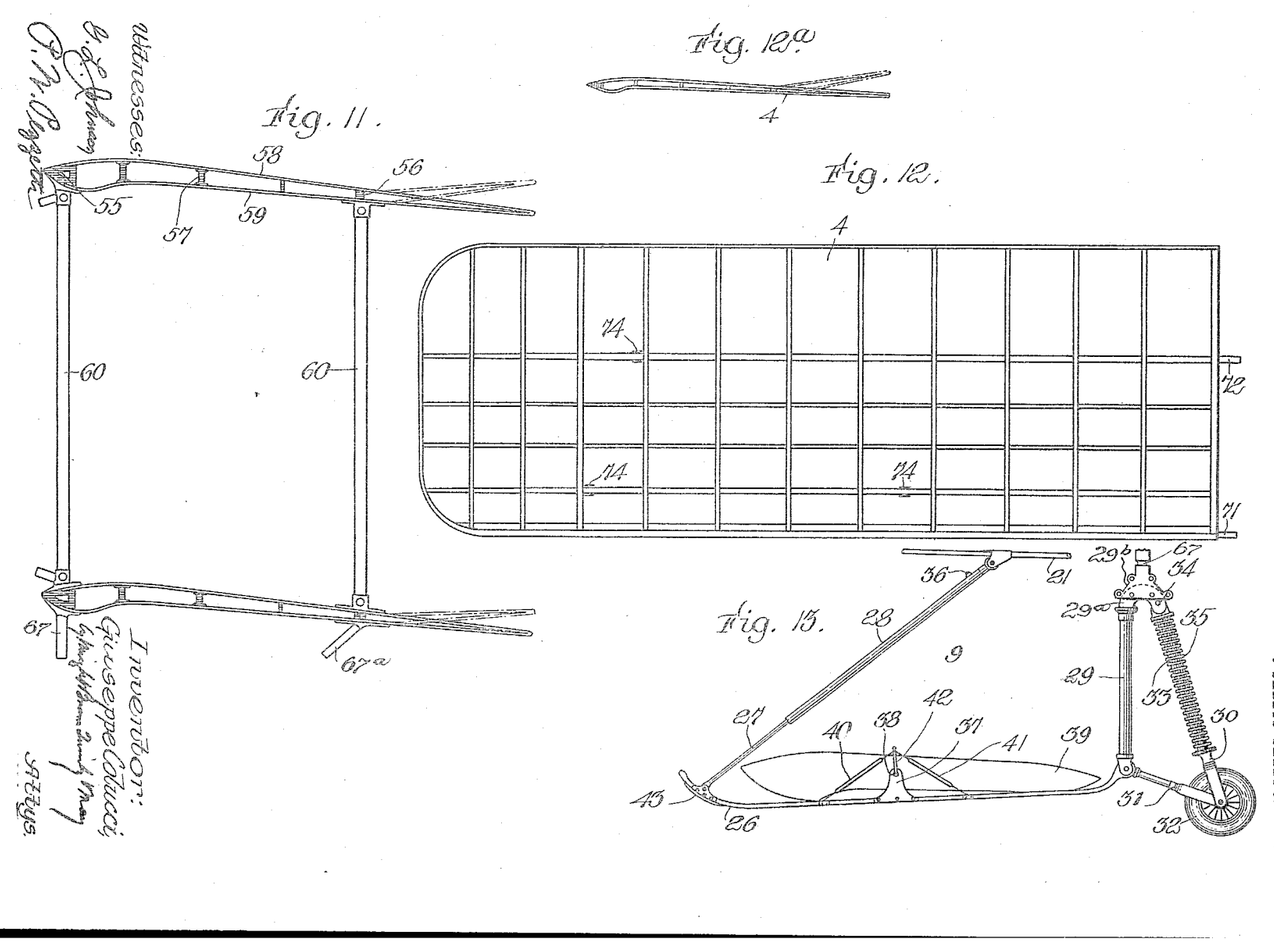

The supporting planes of each side of the body are separate from one another and are separately attached. These planes I will term "wings" for the purpose of description. They are alternately of monoplane and biplane construction, but in detail all the planes are substantially alike and description of one will suffice for all. Reference for such a description may be had to Figs. 9, 10, and 11, which show the details of one of the biplane wings. The structure of each wing includes a longitudinal front edge piece 55 of tubular structure and wedge shaped in cross section with its apex pointing forwardly as appears clearly from Fig. 11. In addition there is a rear longitudinal member 56 and intermediate longitudinals 57. Conveniently they may be made partly of metal and partly of wood, or certain of them may be metal, and the others wood in any proportions necessary to secure the degree of flexibility or rigidity. Across them extend upper and lower wooden transverse ribs 58 and 59 shaped as shown in Fig. 11 to give the proper form to the wing surfaces. These frames thus constructed are covered on both sides with fabric of a character suitable for the purpose.

The upper and lower planes of the biplane wings are alike except that the upper plane is longer than the lower by fifty-nine inches in the design here illustrated. Upright braces 60 extend from one frame to the other between the foremost and rearmost longitudinal members of the wing structures. The parts of the wings thus braced are rigid, while the rear portions, amounting to about one-third of the entire fore and aft dimension are flexible. On the extreme ends and rear of the upper planes of the biplane wings, where such planes extend beyond the lower planes are ailerons 62 pivotally attached to the rearmost longitudinal 56 and provided for the well understood purpose of controlling the lateral stability. Each of these wings is connected with the body frame work as shown in Fig. 10 by connecting braces 63, 64 and is provided with couplers 65 for connection across the top of the body with the wing on the other side through the medium of a coupling tube 66, as shown in Fig. 1. They also have tubes 67 for connection with parts of the landing carriage.

The monoplane wings are mounted directly forward of the biplane wings as shown in Fig. 2 and in vertical placement lie midway between the upper and lower planes of the latter. They are connected to the frame by couplings 68, shown in Fig. 10.

The foregoing completes a description of the supporting surfaces of the machine, the same comprising two monoplane wings and two biplane wings on each side, making four wings or six planes in all. The disposition of these planes is such that not only are all direct currents of air made use of for support, but also the indirect currents and eddies reflected and flowing from certain of the planes are caused to act effectively upon other planes and to increase the supporting power. This disposition of the wings is an exceedingly important feature of the invention, as it permits an immense increase in the effective supporting area without requiring any single plane to have an especially large area, and particularly without occasioning departure from the proportions of each plane which have been found most efficient from exhaustive experimentation.

The profiles of the wings are of importance, and in constructing machines commercially those which I have illustrated in the various sectional views should be exactly followed. All the biplane wings have the forms shown in Fig. 11. This profile is considerably different from that of the monoplane wings shown in Fig. 12ª. The latter is thinner, that is, of less depth at the forward edge than is the former, and is also of flatter curvature and less descent toward the rear. By this means I effect a considerable diminution in the resistance to forward movement. Aft of the supporting planes are fixed horizontal guiding monoplane wings 4 having a frame structure substantially as shown in Fig. 11, and being provided with tubular projections 71, 72 at the inner ends of their longitudinal members for attachment to the body frame. Provision is thus made for flexibility of tips of the guide wings. In Fig. 12, which shows one of these guide wings, I have shown at 74 means of attachment for stay wires which may be run from these points to the body, if required to stiffen the wings. I prefer not to use such stay means, however, since one of the principal features of the invention is the elimination of all wires or analogous ligaments from exposed places, from which there results lessened wind resistance. The only parts outside of the body and landing carriages against which the air can act to impede forward progress are the struts and braces which support the planes away from the body, and these are reduced to the minimum number. The braces which connect the two planes of a biplane wing are in the same vertical planes with the inclined braces extending therefrom to the monoplane wings, all such braces being thereby in tandem arrangement and occasioning no more air resistance than would one single brace.

Figure 14:
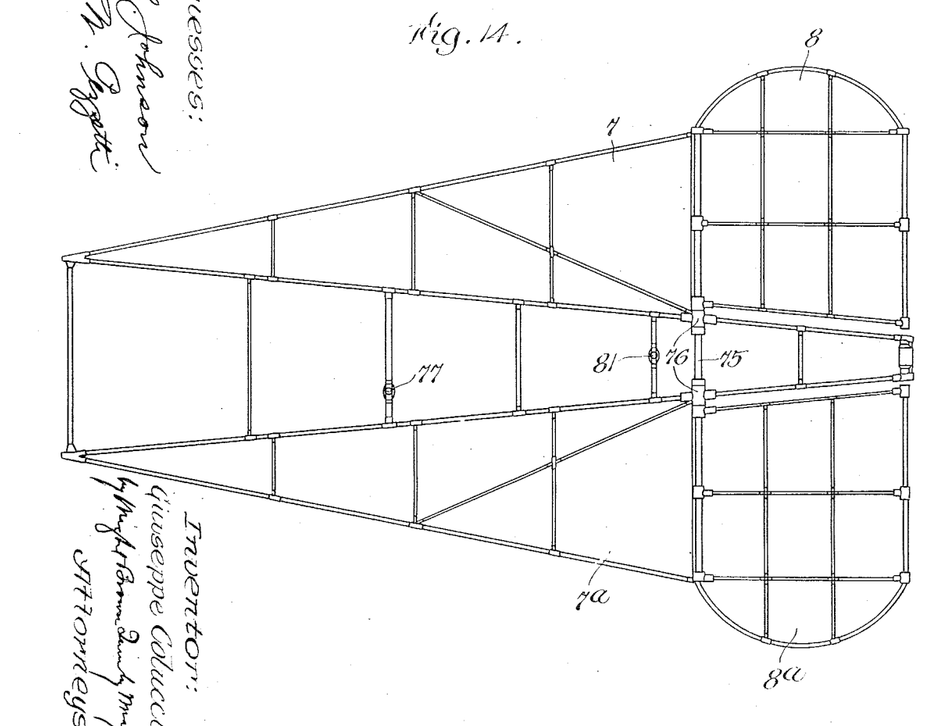
Fig. 14 is an elevation of the rear portion of the rear end of the machine showing the vertical stabilizing keel and the vertical rudder.
Figure 15:
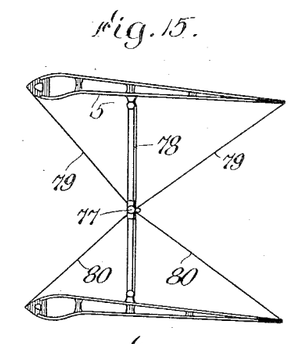
Fig. 15 is a cross section and Fig. 16 a plan of the double or biplane elevating rudder.

The detail of the rearmost part of the machine, in Fig. 14, shows the framing of the keel or vertical stabilizing plane, and the vertical or steering rudder. This keel consists of a frame work of which the members are clearly shown in Fig. 14, composed preferably of sections of tubing welded together and disposed to provide sufficient rigidity. The portions of the frame work extending beyond the body are covered with cloth and consist of the upper fin 7 and the lower fin 7ª. A rod 75 passes along the rear end of this keel and is pivotally attached thereto in bearings 76, carrying the frames of the upper and lower rudders 8 and 8ª, which are thus rigidly fastened together and are oscillated in unison to control the lateral direction. These rudder frames are also preferably formed of steel tubes welded together.

Figure 16:
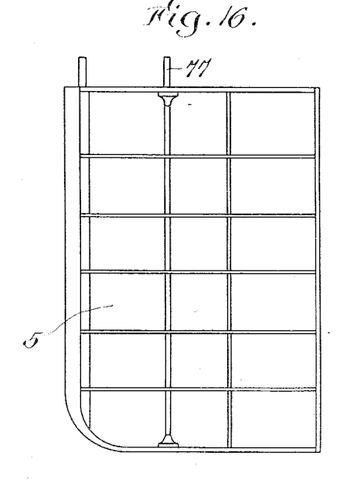

Fig. 14 also shows at 77 and 81 respectively the pivot points for the double or biplane elevating rudders 5 and for the single or monoplane elevating rudders 6. The biplane rudders are shown in further detail in Figs. 15 and 16. There are preferably two of such rudders mounted on respectively opposite sides of the tail frame. Each rudder comprises two planes constructed substantially according to the principles explained in connection with the supporting wings, which are secured together and maintained at the proper distance apart by struts 78 and tension members or stays 79 and 80. The structure so constituted is provided with a pivot rod 77 in a position near the geometrical axis of the rudder structure, which pivot rod is oscillatively mounted in the socket indicated at 77 in Fig. 14.

Figure 4:
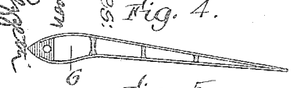
Figs. 4 and 5 are, respectively, a sectional view and a plan of the monoplane elevating rudder.
Figure 5:
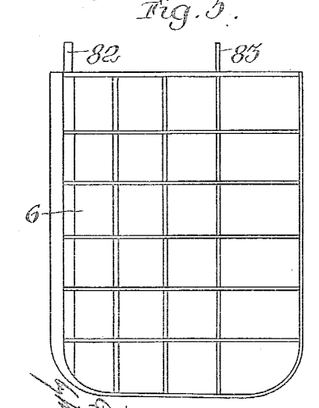

The monoplane elevating rudder is shown in detail in Figs. 4 and 5. There are two of such rudders, located at opposite sides of the tail portion of the machine body in the same plane. The framing of each of the monoplane rudders is carried out according to the principles already described. A pivot rod or stud 82 projects from near the forward edge at one end at each of the rudder wings and is pivotally attached to the tail frame at the location indicated at 81. The projecting rib 83 shown in Fig. 5 is a part of the rudder frame structure and is adapted to be contained in a guide in the tail frame so as to assist in supporting the rudder.

It is to be understood that the guiding means including the rudders and ailerons are to be operated by the aviator by suitable controls, but as I do not claim in this application any particular form of control, I have not deemed it necessary to illustrate such control, considering it sufficient for the explanation of my invention to state that the biplane and monoplane rudders 5 and 6 are pivotally mounted so as to oscillate about horizontal axes in substantially the manner already described.

The drawings illustrating the above described invention represent in correct detail the proportions of a machine designed to carry as many as fifteen passengers weighing approximately one hundred and fifty pounds each and supplies of fuel, lubricant, etc., sufficient for a flight of thirty hours, and when thus loaded to attain a speed of twenty-eight to thirty miles per hour. The machine without loading weighs about five thousand two hundred eighty pounds, and when loaded as above indicated weighs seven thousand seven hundred and fifty pounds. The dimensions of the body are sufficiently great to provide accommodations therein for the number of passengers indicated. The maximum diameter of the body in the design here illustrated is nearly six feet and its length is thirty-nine feet. The supporting surface of the upper plane of each biplane wing is two hundred thirty-two square feet and of each lower plane and monoplane wing one hundred ninety-seven square feet, such planes being, respectively, thirty-one and twenty-six and one-quarter feet in length, and seven and one-half feet in width, making a total wing area for the main supporting plane, of two thousand five hundred and four square feet. Owing to the disposition of the wings already described these surfaces are all rendered effective and each square foot of surface is enabled to do its proportional part in supporting the weight of the machine and its load when in the air. In securing the lifting power the elimination of resistance and the profiles of the wings are factors of greatest importance. Another point which should not be overlooked is that the flexible construction of the various planes provides an automatic stability and makes the ailerons 62 in large measure unnecessary. The latter are, however, provided as a precaution, and they may be operated either by the pilot or automatically. The angle of attack of the planes influences enormously the lifting component while offering the minimum resistance to penetration and permitting attainment of a very high initial speed.

I claim:

1. A flying machine comprising a body, and a plurality of pairs of supporting wings extended from said body, said wings being alternately monoplanes and biplanes, and in combination therewith, a pivotally mounted, substantially horizontal, elevating plane.

2. A flying machine comprising a body, and a plurality of pairs of fixed supporting wings extended from said body, said wings being alternately monoplanes and biplanes and the monoplane wings being arranged at a height substantially midway between the upper and lower planes of the multiplane wings.

3. An aeroplane flying machine comprising a body, a monoplane wing structure at the forward end of said body, a biplane wing structure in the rear of said monoplane, a second monoplane structure in rear of said biplane structure and a second biplane wing structure in rear of said monoplane wing structure, each monoplane being approximately midway between the planes of the next rearward biplane structure as to its vertical location.

4. A flying machine comprising monoplane and biplane supporting wings in alternating tandem arrangement, a monoplane stabilizing means at the rear part of the machine, a biplane horizontal rudder in rear of said stabilizing means and a monoplane horizontal rudder in rear of the biplane rudder.

5. A mono-multi-plane flying machine including in its construction monoplane and multiplane wings in tandem arrangement, the monoplane wing being intermediate the planes of the multiplane wing as to its vertical location.

6. In a flying machine the combination with the supporting planes of substantially horizontal elevating planes or rudders, one of said rudders being composed of superposed planes adapted to tilt about a substantially horizontal axis, and another of said rudders being a single plane in rear of the plural-plane rudder adapted to tilt about a horizontal axis.

7. In a flying machine comprising main supporting planes, a biplane horizontal rudder, and a monoplane horizontal rudder arranged at an elevation intermediate the planes of the biplane rudder and in rear thereof.

In testimony whereof I have affixed my signature, in presence of two witnesses.

GIUSEPPE COLUCCI.

Witnesses:
 ARTHUR H. BROWN,
 P. W. PEZZETTI.